US010599817B2

(12) United States Patent
Taneja et al.

(10) Patent No.: US 10,599,817 B2
(45) Date of Patent: Mar. 24, 2020

(54) PORTION-LEVEL DIGITAL RIGHTS MANAGEMENT IN DIGITAL CONTENT

(71) Applicant: Adobe Inc., San Jose, CA (US)

(72) Inventors: Salil Taneja, Noida (IN); Arneh Jain, Calicut (IN)

(73) Assignee: Adobe Inc., San Jose, CA (US)

( * ) Notice: Subject to any disclaimer, the term of this patent is extended or adjusted under 35 U.S.C. 154(b) by 27 days.

(21) Appl. No.: 15/063,996

(22) Filed: Mar. 8, 2016

(65) Prior Publication Data
US 2017/0262619 A1 Sep. 14, 2017

(51) Int. Cl.
G06F 21/00 (2013.01)
G06F 21/10 (2013.01)
G06F 21/31 (2013.01)
G06F 21/60 (2013.01)

(52) U.S. Cl.
CPC ............ G06F 21/10 (2013.01); G06F 21/31 (2013.01); G06F 21/602 (2013.01); G06F 2221/0713 (2013.01)

(58) Field of Classification Search
CPC ........ G06F 21/10; G06F 21/602; G06F 21/31; G06F 2221/0713
USPC .......................................................... 726/28
See application file for complete search history.

(56) References Cited

U.S. PATENT DOCUMENTS

| 6,317,795 B1 * | 11/2001 | Malkin ................. H04N 7/162 709/246 |
| 6,978,376 B2 | 12/2005 | Giroux et al. |
| 7,013,149 B2 | 3/2006 | Vetro et al. |
| 7,523,400 B2 * | 4/2009 | McKeeth ................ G06F 9/453 715/749 |
| 8,316,020 B1 | 11/2012 | Kleinmann |
| 8,838,646 B2 | 9/2014 | Kuehr-McLaren et al. |
| 9,613,190 B2 | 4/2017 | Ford et al. |
| 9,928,374 B2 | 3/2018 | Anantharaman |
| 9,953,142 B2 | 4/2018 | Anantharaman |
| 10,248,802 B2 | 4/2019 | Anantharaman |
| 10,346,594 B2 | 7/2019 | Anantharaman |
| 10,460,082 B2 | 10/2019 | Anantharaman |

(Continued)

OTHER PUBLICATIONS

"Pre-Interview Communication", U.S. Appl. No. 14/812,825, dated Oct. 21, 2016, 3 pages.

(Continued)

Primary Examiner — Syed A Zaidi
(74) Attorney, Agent, or Firm — SBMC

(57) ABSTRACT

Portion-level digital rights management (DRM) in digital content is described. In one or more embodiments, a selection of a portion of the digital content is received at a computing device. Then, a policy is assigned to the selected portion by adding a markup element with an identifier to the selected portion. Based on the assigned policy, the selected portion is encrypted without encrypting another portion of the digital content. Subsequently, access to the selected portion is controlled based on the policy independently of the other portion. In this way, different portions of a single document can be protected with different policies. Different users may then have access to different portions of the digital content based on their user ID being associated with a particular policy, which improves security and management of distributable digital content.

20 Claims, 7 Drawing Sheets

(56) References Cited

U.S. PATENT DOCUMENTS

| | | | |
|---|---|---|---|
| 2002/0002563 A1* | 1/2002 | Bendik | G06F 17/248 715/255 |
| 2002/0077985 A1 | 6/2002 | Kobata et al. | |
| 2002/0077986 A1 | 6/2002 | Kobata et al. | |
| 2003/0052911 A1 | 3/2003 | Cohen-Solal | |
| 2004/0044779 A1 | 3/2004 | Lambert | |
| 2004/0148424 A1 | 7/2004 | Berkson | |
| 2005/0044016 A1* | 2/2005 | Irwin | G06F 21/10 705/30 |
| 2005/0066357 A1 | 3/2005 | Ryal | |
| 2005/0125673 A1 | 6/2005 | Cheng et al. | |
| 2005/0273514 A1 | 12/2005 | Milkey et al. | |
| 2006/0041502 A1 | 2/2006 | Blair et al. | |
| 2006/0149727 A1 | 7/2006 | Viitaharju | |
| 2007/0156659 A1 | 7/2007 | Lim | |
| 2007/0180519 A1 | 8/2007 | Boccon-Gibod et al. | |
| 2007/0204078 A1 | 8/2007 | Boccon-Gibod et al. | |
| 2008/0005235 A1* | 1/2008 | Hegde | G06Q 10/10 709/204 |
| 2008/0059474 A1 | 3/2008 | Lim | |
| 2008/0060084 A1* | 3/2008 | Gappa | G09B 5/00 726/28 |
| 2008/0104118 A1* | 5/2008 | Pulfer | G06F 17/30722 |
| 2008/0167921 A1 | 7/2008 | Seo et al. | |
| 2008/0182592 A1 | 7/2008 | Cha et al. | |
| 2008/0320000 A1 | 12/2008 | Gaddam | |
| 2009/0007227 A1 | 1/2009 | Burgess et al. | |
| 2009/0048908 A1 | 2/2009 | Kaplan et al. | |
| 2009/0228486 A1 | 9/2009 | Kuehr-McLaren et al. | |
| 2009/0300712 A1 | 12/2009 | Kaufmann et al. | |
| 2010/0005518 A1 | 1/2010 | Tirpak et al. | |
| 2010/0185502 A1 | 7/2010 | Roberts et al. | |
| 2010/0293049 A1 | 11/2010 | Maher et al. | |
| 2010/0293058 A1 | 11/2010 | Maher et al. | |
| 2011/0235799 A1 | 9/2011 | Sovio et al. | |
| 2011/0258049 A1 | 10/2011 | Ramer et al. | |
| 2012/0066269 A1 | 3/2012 | Kim | |
| 2012/0216300 A1 | 8/2012 | Vivolo et al. | |
| 2012/0303827 A1 | 11/2012 | Neystadt et al. | |
| 2013/0052990 A1 | 2/2013 | Zhang | |
| 2013/0254699 A1 | 9/2013 | Bashir et al. | |
| 2013/0315392 A1 | 11/2013 | Steinhauser | |
| 2013/0332987 A1 | 12/2013 | Tenneti et al. | |
| 2014/0040371 A1 | 2/2014 | Gurevich et al. | |
| 2014/0181993 A1 | 6/2014 | Jogand-Coulomb et al. | |
| 2014/0201351 A1 | 7/2014 | Fransen | |
| 2014/0278821 A1 | 9/2014 | McConnell | |
| 2014/0298207 A1 | 10/2014 | Ittah et al. | |
| 2014/0304836 A1 | 10/2014 | Velamoor et al. | |
| 2014/0338001 A1 | 11/2014 | Zhang et al. | |
| 2015/0058347 A1 | 2/2015 | Russek | |
| 2015/0120648 A1 | 4/2015 | Slovacek | |
| 2015/0234796 A1 | 8/2015 | Williams et al. | |
| 2015/0281299 A1 | 10/2015 | Moustafa et al. | |
| 2015/0310188 A1 | 10/2015 | Ford et al. | |
| 2015/0324698 A1 | 11/2015 | Karaoguz et al. | |
| 2016/0021503 A1 | 1/2016 | Tapia | |
| 2016/0189198 A1 | 6/2016 | McKenzie et al. | |
| 2017/0032109 A1 | 2/2017 | Anantharaman | |
| 2017/0041296 A1 | 2/2017 | Ford et al. | |
| 2017/0142076 A1 | 5/2017 | Ford et al. | |
| 2017/0163839 A1 | 6/2017 | Arana et al. | |
| 2017/0177886 A1 | 6/2017 | Anantharaman | |
| 2017/0249663 A1 | 8/2017 | Hajiyev et al. | |
| 2017/0277868 A1 | 9/2017 | Anantharaman | |
| 2017/0278205 A1 | 9/2017 | Anantharaman | |
| 2017/0278206 A1 | 9/2017 | Anantharaman | |
| 2017/0286642 A1 | 10/2017 | Anantharaman | |
| 2018/0060598 A1 | 3/2018 | Anantharaman | |
| 2018/0137121 A1 | 5/2018 | Agarwal | |

OTHER PUBLICATIONS

"First Action Interview Office Action", U.S. Appl. No. 14/812,825, dated Mar. 24, 2017, 3 pages.

"Pre-Interview Communication", U.S. Appl. No. 14/975,442, dated Aug. 4, 2017, 3 pages.

Surminen,"Location-based DRM using WiFi Access Points", 2007 International Symposium on Communications and Information Technologies (ISCIT 2007), 2007, 5 pages.

"Corrected Notice of Allowance", U.S. Appl. No. 14/975,442, dated Nov. 29, 2017, 4 pages.

"Non-Final Office Action", U.S. Appl. No. 15/090,211, dated Nov. 17, 2017, 18 pages.

"Notice of Allowance", U.S. Appl. No. 14/812,825, dated Dec. 18, 2017, 7 pages.

"Non-Final Office Action", U.S. Appl. No. 15/080,062, dated Nov. 3, 2017, 16 pages.

"Notice of Allowance", U.S. Appl. No. 14/975,442, dated Nov. 2, 2017, 8 pages.

"Final Office Action", U.S. Appl. No. 14/812,825, dated Sep. 7, 2017, 9 pages.

"Final Office Action", U.S. Appl. No. 15/090,211, dated May 3, 2018, 17 pages.

"Final Office Action", U.S. Appl. No. 15/080,062, dated May 10, 2018, 17 pages.

"Corrected Notice of Allowance", U.S. Appl. No. 14/975,442, dated Feb. 27, 2018, 5 pages.

Chen,"An Approach of Digital Rights Management for E-Museum with Enforce Context Constraints in RBAC Environments", IEEE International Conference on Systems, Man, and Cybernetics; Tapei, Taiwan; Print ISSN: 1062-922X, Oct. 2006, pp. 1871-1878.

"First Action Interview Office Action", U.S. Appl. No. 15/803,452, dated Jul. 11, 2018, 3 pages.

"Non-Final Office Action", U.S. Appl. No. 15/080,062, dated Jul. 13, 2018, 16 pages.

"Non-Final Office Action", U.S. Appl. No. 15/090,211, dated Jul. 12, 2018, 16 pages.

"Pre-Interview First Office Action", U.S. Appl. No. 15/079,788, dated Aug. 8, 2018, 26 pages.

"Pre-Interview First Office Action", U.S. Appl. No. 15/080,181, dated Jul. 27, 208, 3 pages.

"Pre-Interview First Office Action", U.S. Appl. No. 15/803,452, dated Jun. 8, 2018, 4 pages.

Carreras,"A Platform for Context-Aware and Digital Rights Management Enabled Content Adaptation", Apr. 2010, 16 pages.

Jung,"Context-aware Policy Enforcement for Android", IEEE 7th International Conference on Software Security and Reliability, Aug. 1, 2013, pp. 40-49.

Muhlbauer,"Location Constraints in Digital Rights Management", Jun. 8, 2018, 8 pages.

"Final Office Action", U.S. Appl. No. 15/803,452, dated Sep. 7, 2018, 11 pages.

"Notice of Allowance", U.S. Appl. No. 15/080,062, dated Feb. 20, 2019, 14 pages.

"Non-Final Office Action", U.S. Appl. No. 15/080,181, dated Mar. 28, 2019, 14 pages.

"Supplemental Notice of Allowability", U.S. Appl. No. 15/803,452, dated Feb. 27, 2019, 2 pages.

"Advisory Action", U.S. Appl. No. 15/803,452, dated Nov. 23, 2018, 3 pages.

"Final Office Action", U.S. Appl. No. 15/079,788, dated Jan. 31, 2019, 10 pages.

"Final Office Action", U.S. Appl. No. 15/080,062, dated Nov. 9, 2018, 21 pages.

"Final Office Action", U.S. Appl. No. 15/090,211, dated Nov. 9, 2018, 15 pages.

"Notice of Allowance", U.S. Appl. No. 15/803,452, dated Dec. 11, 2018, 8 pages.

"Final Office Action", U.S. Appl. No. 15/079,788, dated Jul. 18, 2019, 11 pages.

"Final Office Action", U.S. Appl. No. 15/080,181, dated Jul. 22, 2019, 17 pages.

"Notice of Allowance", U.S. Appl. No. 15/090,211, dated Jun. 19, 2019, 8 pages.

(56) References Cited

OTHER PUBLICATIONS

"Advisory Action", U.S. Appl. No. 15/079,788, dated Jan. 29, 2020, 3 pages.

* cited by examiner

PORTION-LEVEL DIGITAL RIGHTS MANAGEMENT IN DIGITAL CONTENT

BACKGROUND

Digital rights management (DRM) is generally used to protect digital content from unauthorized access. Generally, the DRM either grants or denies access to an entirety of digital content. If a user is granted access to a document, for example, then the user has the same access rights, such as open or print, throughout the entire document.

In some instances, however, a document may be created with confidential content that is intended for sole use by authorized users, while also including common content that is intended for any users. Generally, to protect the confidential content from unauthorized users, multiple copies of the document are created, DRM is applied to each document, and then different copies of the document are distributed to different sets of users. However, management of each of the copies of the document can be challenging, such as to track which user gets which copy. Further, if a user needs to refer to different sections of the document, then that user may need to have multiple copies of the document available. Further still, if access rights change, then a new copy of the document with modified DRM is distributed to those same users who received the original copy. This can lead to redundancy, increased storage use, and user confusion and frustration regarding which document to use.

SUMMARY

Portion-level DRM in digital content is described. In one or more embodiments, a selection of a portion of the digital content is received at a computing device. Then, a policy is assigned to the selected portion to protect the portion with the portion-level DRM. Based on the assigned policy, the selected portion is then encrypted without encrypting another portion of the digital content. Subsequently, access to the selected portion is controlled based on the assigned policy independently of the other portion. In this way, different portions of a single document can be protected with different policies. Different users may then have access to different portions of the digital content based on their user identity (ID) being associated with a particular policy, which improves security and management of distributable digital content.

In at least one embodiment, a call to a file system associated with digital content is intercepted and encrypted portions are identified of the digital content that are encrypted with different policies. In addition, a user that initiated the call is authenticated based on a user ID. Following this, execution of the call can be limited to specific encrypted portions that are encrypted with a policy associated with the user ID. This can include decrypting the specific encrypted portions based on the user ID without decrypting other encrypted portions that are encrypted with policies not associated with the user ID. In this way, the user can gain access to some of the encrypted portions while not being able to access other encrypted portions of the same digital content, which improves security and management of distributable digital content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
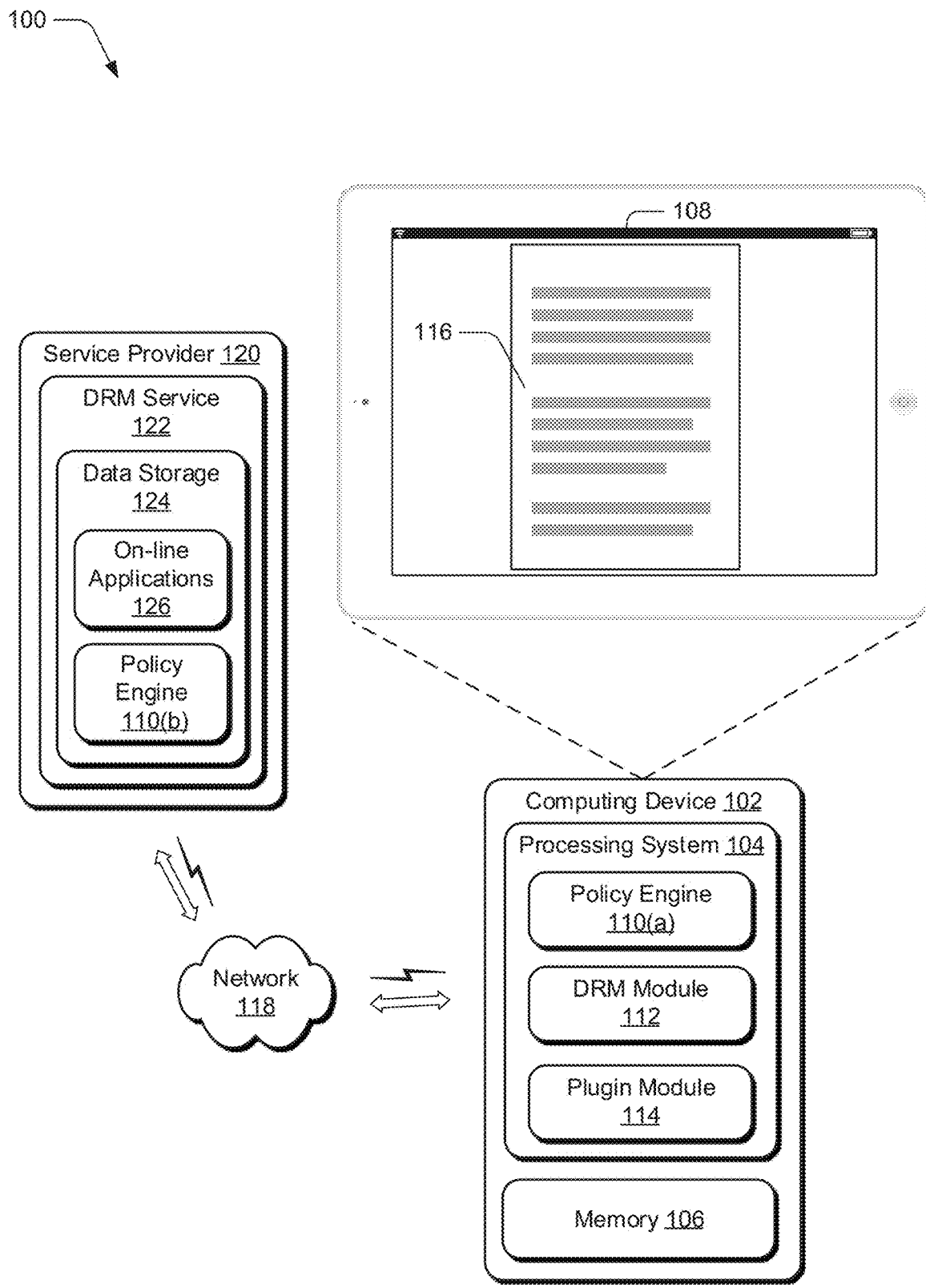
FIG. 1 is an illustration of an environment in accordance with one embodiment that is operable to employ techniques described herein.

Conventional techniques used for digital rights management (DRM) of digital content include limitations and challenges. For instance, these conventional techniques only protect the entire digital content from unauthorized access, and are not capable of protecting different portions of the digital content with different access rights. Further, management of access rights can be complicated. For example, if access rights change for a user or for a portion of the digital content, in conventional techniques new copies of the digital content are required to be distributed to all recipients, including those users whose access rights did not change. Doing this can result in those users having multiple copies of the same digital content, which requires increased storage use, and which can lead to potential confusion as to which copy is the current copy. Also, managing distribution of multiple copies to multiple groups of people with different access rights can be challenging.

In contrast, techniques and systems described herein provide portion-level digital rights management in digital content. These techniques enable different policies to be assigned to different portions of the same digital content.

Each portion can be encrypted with a different policy, which is only accessible to authorized users. In this way, a single document can be distributed to different groups of users and each user can only access those portions for which he or she is authorized to access. For example, assume a CEO of a company wishes to create a report having a section of confidential data and a section of common data. Rather than creating multiple copies of the report (e.g., some copies with the confidential data and other copies without the confidential data), the CEO can instead create a single document and encrypt the confidential data within the document for authorized users only. Then, when authorized users open the document, the users can view the confidential data as well as the common data. However, when an unauthorized user opens the document, the unauthorized user is limited to common data. In embodiments, the confidential data is hidden from the unauthorized user. In addition, different levels of access can be permitted. For example, an authorized user may be able to view but not copy or print the confidential data.

The techniques and systems described herein provide a dynamic solution where access rights to different portions of digital content can be controlled by an author of the digital content. In embodiments, these access rights can be controlled even after distribution of the digital content by utilizing a server or cloud-based service that stores the access rights. In addition, the digital content can be easily managed because the techniques and systems described herein provide a mechanism that allows a single document to be created that will display different portions of content to different users based on each user's access rights. Each user can have access to zero, one, or more protected portions in the document.

The techniques and systems described herein utilize a plugin that allows a user to select a section of content within a document and assign a policy to the selected section of content. The plugin can then separate underlying structures (e.g., extensible markup language (XML) structures) in the document for the selected section of content and assign custom metadata to the structure corresponding to the selected section. The custom metadata may include identification of the policy along with additional information, such as identification of a DRM server. When saving the document, a Save call is intercepted by the plugin to enable portion-level encryption of the selected section based on the assigned custom metadata. When the document is subsequently opened, an Open call is intercepted by the plugin, any protected structures are identified, the user is authenticated, and certain sections are opened according to the permissions of the user.

Using the techniques described herein, different portions of the document are segregated, and control (e.g., Microsoft Office® Document Control) can be created which, when actuated, associates a selected portion of the document with a unique ID that is stored for later use. In addition, different policies (e.g., user-permission maps) can be associated with different portions of the document. The techniques described herein further enable encryption and decryption of different portions of the document by intercepting a Save call and encrypting different portions corresponding to a respective policy, or intercepting an Open call and decrypting different portions corresponding to a respective policy. Using these techniques, different users are provided with different views of the same document, based on their respective permissions. In addition, the plugin can intercept a variety of operations, such as open, print, and so on, and can then log audit information based on a view of the document, where the view is based on the user's permissions.

As used herein, the term "digital content" is representative of data, such as electronic text content (e.g., messages), digital photographs, video, audio, web pages, documents, images, and so on. Additionally, the digital content can include one or more objects, such as a computer model of a real world entity, or a self-contained entity that includes both data and procedures to manipulate the data. The digital content can be displayed for the user, and can be selectable by the user to perform one or more actions.

As used herein, the term "policy" refers to an association between a user and a permission provided to that user. In embodiments, the association can include a mapping or other correlation between user(s) and permissions. In embodiments, a policy is associated with a unique identity (ID) that is usable to encrypt the digital content. Only users having a user ID that matches the unique ID are authorized to access the encrypted digital content. Accordingly, the policy maps the user ID of a user to access rights for that user.

In the following discussion, an example environment is first described that may employ the techniques and systems described herein. Example procedures are then described which may be performed in the example environment as well as other environments. Consequently, performance of the example procedures is not limited to the example environment and the example environment is not limited to performance of the example procedures. Further examples of the above-described terms may be found in relation to the following discussion. Finally, an example system and device are described that are operable to use the techniques and systems described herein in accordance with one or more embodiments.

Example Environment

FIG. 1 is an illustration of an environment 100 in an example embodiment that is operable to utilize techniques usable for portion-level digital rights management in digital content. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Additionally, although a single computing device 102 is shown, the computing device 102 may be representative of a plurality of different devices, such as multiple servers utilized by a business to perform operations "over the cloud" as further described in relation to FIG. 7.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a policy engine 110(a), a DRM module 112, and a plugin module 114, all of which are storable in the memory 106 and as such are implemented at least partially in hardware. The policy engine 110(a), the DRM module 112, and the plugin module 114 are executable by the processing system 104 to cause performance of one or more operations. Other embodiments are also contemplated, such as dedicated hardware components, e.g., application specific integrated circuit, fixed-logic circuitry, and so forth.

The policy engine 110(a) is representative of functionality of the computing device 102 to create and manage policies that define permissions, such as access rights, of various users. Any of a variety of different policies can be created and/or maintained by the policy engine 110. Some example policies define permissions such as view, copy, print, modify, screen capture, sign, switch policy, and so on. In embodiments, a policy can define various limitations to a user's access, such as no access, view only access, view and print only access, full access, and so on. Thus, the policy engine 110 can define a variety of different policies that define any of a variety of access rights of users.

The DRM module 112 is representative of functionality of the computing device 102 to enforce policies assigned to portions of digital content, such as document 116 displayed via display device 108. In embodiments, the DRM module 112 can be a component of a document viewing application, such as Microsoft Word®. For example, the DRM module 112 can be added as part of the application logic or via a plugin. In at least one embodiment, the DRM module 112 can encrypt a selected portion of the digital content, while not encrypting another portion of the document, with a policy associated with a group of users. Thus, only users in that group are authorized to access that encrypted portion of the digital content. However, any unauthorized user can still access the other portion that is not encrypted.

Further, the DRM module 112 can encrypt different portions of the digital content with different policies. For example, consider a financial report that is to be shared within a company, and it is desired that the entire report not be visible to everyone. Using conventional techniques, different versions of the report would need to be created to send to different groups of people. The DRM module 112, however, can encrypt different sections of the report with different policies. In this way, a single report can be created and the DRM module 112 ensures that each user that opens the report views only the sections for which that user is authorized to view. Thus, the DRM module 112 can implement DRM at a sub-level of the entire report by assigning policies to selected sections of the report rather than the entire report.

The plugin module 114 is representative of functionality to mark metadata to the selected portion to enable the DRM module 112 to perform portion-level encryption. For example, the plugin module 114 can separate extensible markup language (XML) structures in the document 116 for the selected portion, and mark the XML structure for the selected portion with a tag associated with a policy. In at least one embodiment the tag can include metadata (e.g., identifier) associated with the policy along with additional information, such as identification of a DRM server. The tag can be stored with the final XML format of the document. The plugin module 114 is also representative of functionality to intercept calls to a file system or application layer and determine whether to allow execution of the calls based on the user's permissions. For instance, the plugin module 114 can intercept a call to open a document, decrypt relevant sections of the document based on the user's permissions, and hide portions of the document that should not be visible to the user based on the user's lack of permission. Then, the plugin module 114 can allow a document viewing program to handle execution of the calls on the decrypted portions of the document.

The environment 100 is also illustrated as including a network 118 via which the computing device 102 can communicate with other connected entities, such as one or more additional computing devices, servers, and so forth. Although the network 118 is illustrated as the Internet, the network may assume a wide variety of configurations. For example, the network 118 may include a wide area network (WAN), a local area network (LAN), a wireless network, a public telephone network, an intranet, and so on. Further, although a single network 118 is shown, the network 118 may be representative of multiple networks.

The environment 100 also includes a service provider 120 that can be communicatively coupled to the computing device 102 via the network 118. Functionality represented by the service provider 120 may be performed by a single entity, may be divided across other entities that are communicatively coupled via the network 106, or any combination thereof. Thus, the functionality represented by the service provider 120 can be performed by any of a variety of entities, including a cloud-based service, an enterprise hosted server, or any other suitable entity.

The service provider 120 is representative of functionality to provide one or more network-based services, such as DRM service 122. In at least one example, the DRM service 122 can be provided via a web application that is accessible by client devices (e.g., the computing device 102). The DRM service 122 includes data storage 124 that may be implemented as any suitable memory, memory device, or electronic data storage for network-based data storage. The data storage 124 further maintains a policy engine 110(b) representing an instance of the policy engine 110(a), as well as on-line applications 126 (e.g., network-based applications). In at least some embodiments, the policy engine 110(b) and the on-line applications 126 are accessible by the computing device 102.

Portion-Level Digital Rights Management

The following discussion describes example embodiments of portion-level digital rights management in digital content that can be employed to perform various aspects of techniques discussed herein. The example embodiments may be employed in the environment 100 of FIG. 1, the system 700 of FIG. 7, and/or any other suitable environment.

Figure 2:
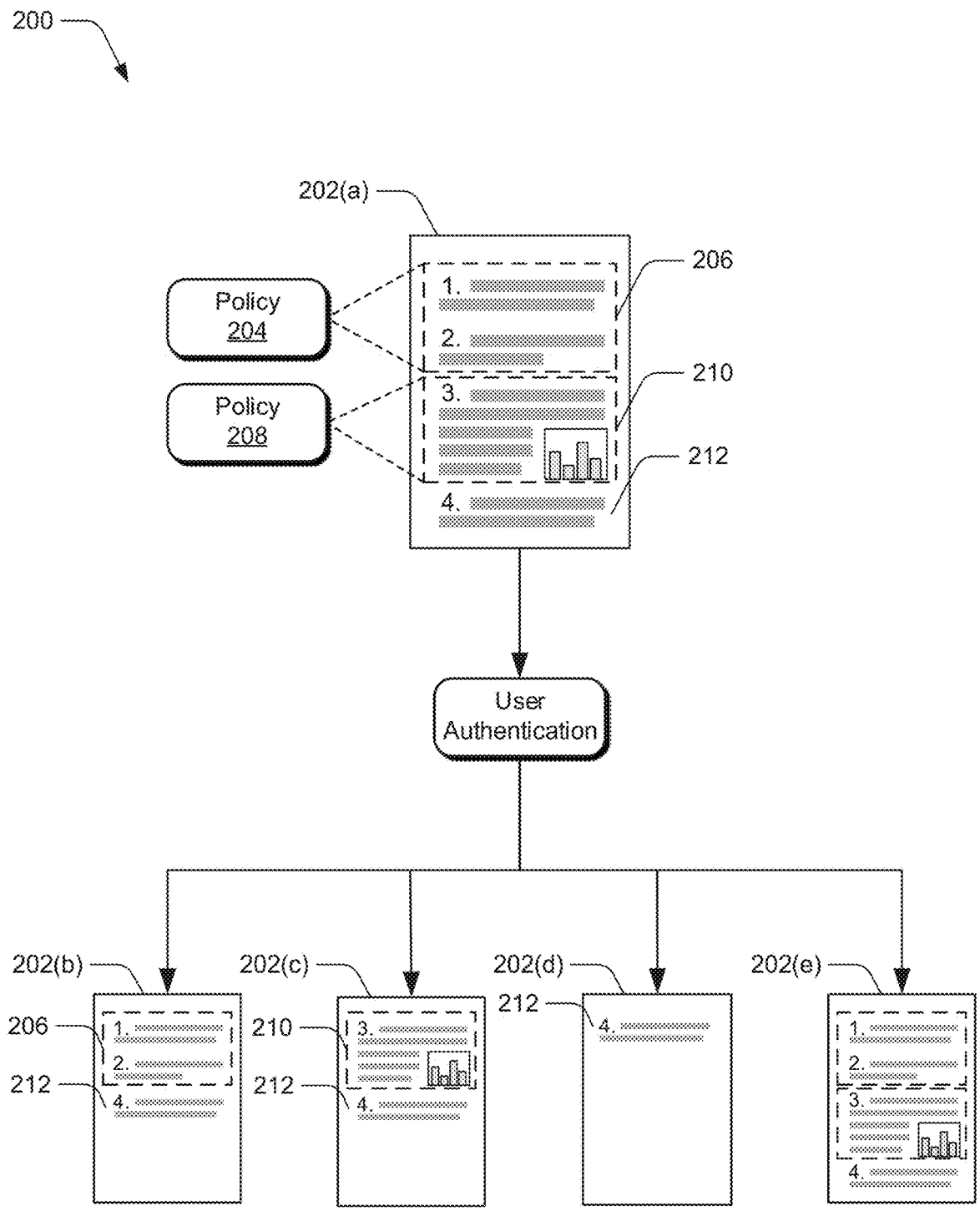
FIG. 2 depicts an example system in accordance with one embodiment that is operable to utilize techniques and systems for portion-level digital rights management in digital content in accordance with one or more embodiments.

FIG. 2 depicts an example embodiment 200 that is operable to utilize techniques and systems for portion-level DRM management in digital content. The example embodiment 200 includes a document 202(a) with content in accordance with one or more embodiments. The document 202(a) can include any of a variety of formats, some examples of which include .doc, .docx, .xls, .pdf, .html, .txt, and so on. Although the examples described herein are described with respect to the .docx format, any of a variety of formats can be utilized with these techniques.

In the illustrated example, the document 202(a) includes multiple sections of content, such as text items 1-4 and a bar graph. A policy 204 is assigned to a section 206 of the document 202(a), such as by the plugin module 114 of FIG. 1 marking the section 206 with the policy 204. In this example, the section 206 includes text items 1 and 2. In addition, another policy, such as policy 208, is assigned to a different section of the same document. In particular, the policy 208 is assigned to section 210, which includes text item 3 and a bar graph. The document 202(a) can also include common content, such as text item 4, which is not assigned a policy and is thus accessible by any user who opens the document 202(a).

Using the techniques described herein, protected sections of the document 202(a) can be created by encrypting section 206 according to the policy 204, and encrypting section 210 according to policy 208. In addition, when the document 202(a) is opened, the user is authenticated based on a user identity to determine if the user is authorized to access any of the protected sections of the document 202(a). If the user is authenticated with the policy 204 and not the policy 208, then the document 202(a) can be opened as document 202(b), which includes the section 206 along with the common content 212. Notice that the section 210 is not displayed in the document 202(b) for the user. This may be because the section 210 is encrypted with a restrictive policy (e.g., policy 208) that does not allow unauthorized users to view the section 210. Similarly, if the user opening the document 202(a) is authenticated with the policy 208 and not the policy 204, then document 202(c) is opened with only the section 210 and the common content 212.

If the user is not authenticated with any of the policies 204, 208, then document 202(d) is opened with only the common content 212 that is not assigned any policy. In embodiments, if the user is authenticated with all of the policies 204, 208, then document 202(e) is opened to include all of the content.

As mentioned above, the degree of access provided to the user to the section of content is dependent on the access rights granted by the policy. For instance, the user may have authorization to view, but not to copy, print, or modify the section in any way. A different user, however, may have permission to copy or print that same section, but may not have permission to modify the section. Still another user may have permission to modify that same section. In embodiments, the policy may not allow unauthorized users to view the portion. Additional examples include authorization to sign or screen capture the section.

Figure 3:
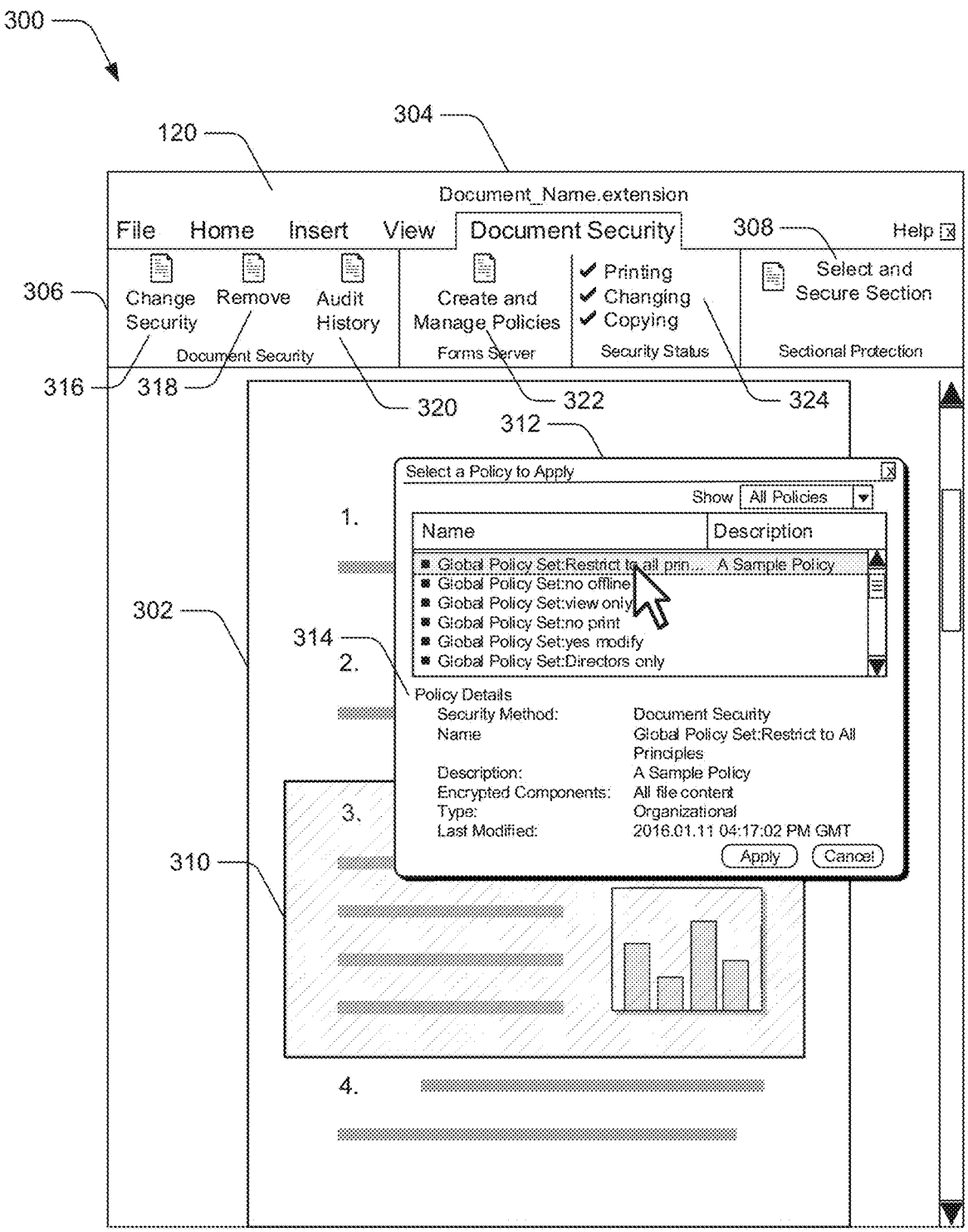
FIG. 3 depicts an example system in accordance with one embodiment of a user interface that is operable to utilize techniques and systems for portion-level DRM in digital content in accordance with one or more embodiments.

FIG. 3 depicts an example embodiment 300 that illustrates portion-level DRM in digital content in accordance with one or more embodiments. In the illustrated example 300, a document 302 is displayed by application 304. Any suitable application can be used, such as a word processor, a spreadsheet, a presentation application, and so on. Example applications include Microsoft Word®, Pages®, Microsoft Excel®, Microsoft PowerPoint®, Adobe Persuasion®, and so on.

Alternatively or in addition, the document 302 includes a toolbar 306 with various example selectable options, such as File, Home, Insert, and so on. Other options are also contemplated, such as Document Security, which includes various sub-options that are selectable to execute various actions with respect to content within the document 302. For instance, the sub-options include option 308 to select and secure a section within the document 302. In embodiments, the user can select a portion 310 of content within the document 302, such as by highlighting the portion 310 of content. In combination with selecting the portion 310 of the content, the user can select the option 308 to select and secure a section to initiate a display of pre-defined policies that are usable to assign to the highlighted portion 310. These policies can be displayed in any suitable way, such as via a pop-up window, a drop down menu, and so on.

In the example embodiment 300, a popup window 312 is displayed that includes a list of policies that each define permissions provided to a specific set of users. Responsive to selection of one of the policies from the list, additional information associated with the selected policy can be display in the window 312, such as policy details 314, which includes a type of security method, a name of the policy, a description of the policy, and so on. Any suitable information can be included in the policy details 314 to describe the selected policy.

The selected policy can then be assigned to the selected portion 310 of the document 302. Responsive to a call to save the document 302, the call is intercepted by a plugin, such as the plugin module 114 from FIG. 1, and the policy assigned to the selected portion 310 is stored in an extensible markup language (XML) format of the document 302. For example, the plugin module 114 can separate XML structures in the document 302 for the selected portion 310, and tag the XML structure for the selected portion 310 with the policy. The tag can include custom metadata (e.g., policy details) associated with the policy.

Then, the XML structures for the selected portion 310 are encrypted using the policy assigned to the selected portion 310. In embodiments, the encryption is performed by patching operating system (OS) functions in the context of the application. In this way, these patched functions are portion-aware rather than simply document-aware.

As mentioned above, the Document Security option includes various sub-options. Some example sub-options include Change Security 316, Remove 318, Audit History 320, and Create and Manage Policies 322. These are but a few examples, which are not intended to be limiting. Other sub-options are also contemplated. The Change Security 316 option can allow a user to change a policy currently assigned to a portion of the content. The Remove 318 option can allow a user to remove a policy currently assigned to a portion of the content. In addition, the Audit History 320 option can allow a user to view a history of policy assignments made to different portions of the document 302.

The Create and Manage policies 322 option can allow a user to create new policies with which to apply to different portions of the document 302. In addition to creating new policies, pre-defined policies can be modified, such as by changing which users are included in a group associated with a particular policy, changing which policy is assigned to which portion of the content, modifying the policy details, and so on. In embodiments, the policies can be stored in the policy engine 110(b) of the cloud-based DRM service 122 in FIG. 1 or of an enterprise server. By storing the policies remotely, an author of the document 302 can manage the policies even after distribution of the document 302, and independently of the document 302. Thus, a variety of controls can be implemented to manage pre-defined policies and/or create new policies.

For example, if John's access rights change because he changes departments or is promoted, then the author of the document 302 can simply modify some of the policies to change John's access rights to portions of the document that are assigned those policies, rather than creating a new copy of the document 302 with new policies and redistributing the new copy. Subsequently, when John attempts to open the document 302, he can enter his credentials, and the DRM service 122 or the enterprise server can be contacted to obtain a list of John's permissions. Then, the document 302 can be opened with the portions of content for which John has permission to access, which may include different portions from the previous portions he could access prior to the policy change.

In another example, assume a document is distributed to different groups of people, and the document has different portions of content protected with portion-level DRM. Subsequent to distribution, it is determined that a confidential section of the document that was previously accessible to only vice presidents can now be accessible to lower-level managers. Rather than creating a new copy of the document with new policies, the policies stored at the server can be modified. For example, a policy that was used to encrypt the confidential section can be modified at the server to include user ID's of the lower-level managers. Now when the lower-level managers open the document, the server is contacted to obtain updated policies, and the document is opened with the confidential section included. In this way, those lower-level managers can now access the confidential section, which may have been previously hidden from view, in the same document that was originally distributed to them.

In addition, the application 304 can provide a visual indication to the user of which permissions the user is granted for a particular section. The visual indication can be, as illustrated at 324, a list of permissions with a check or other marking that is updated in real time to dynamically indicate to the user the user's permissions related to a selected section. For example, the user can select a section, or hover the cursor over the section, that has an assigned policy, and the Security Status in the toolbar can indicate to the user that the user has permission to print, change, and/or copy the content in the selected portion 310.

Figure 4:
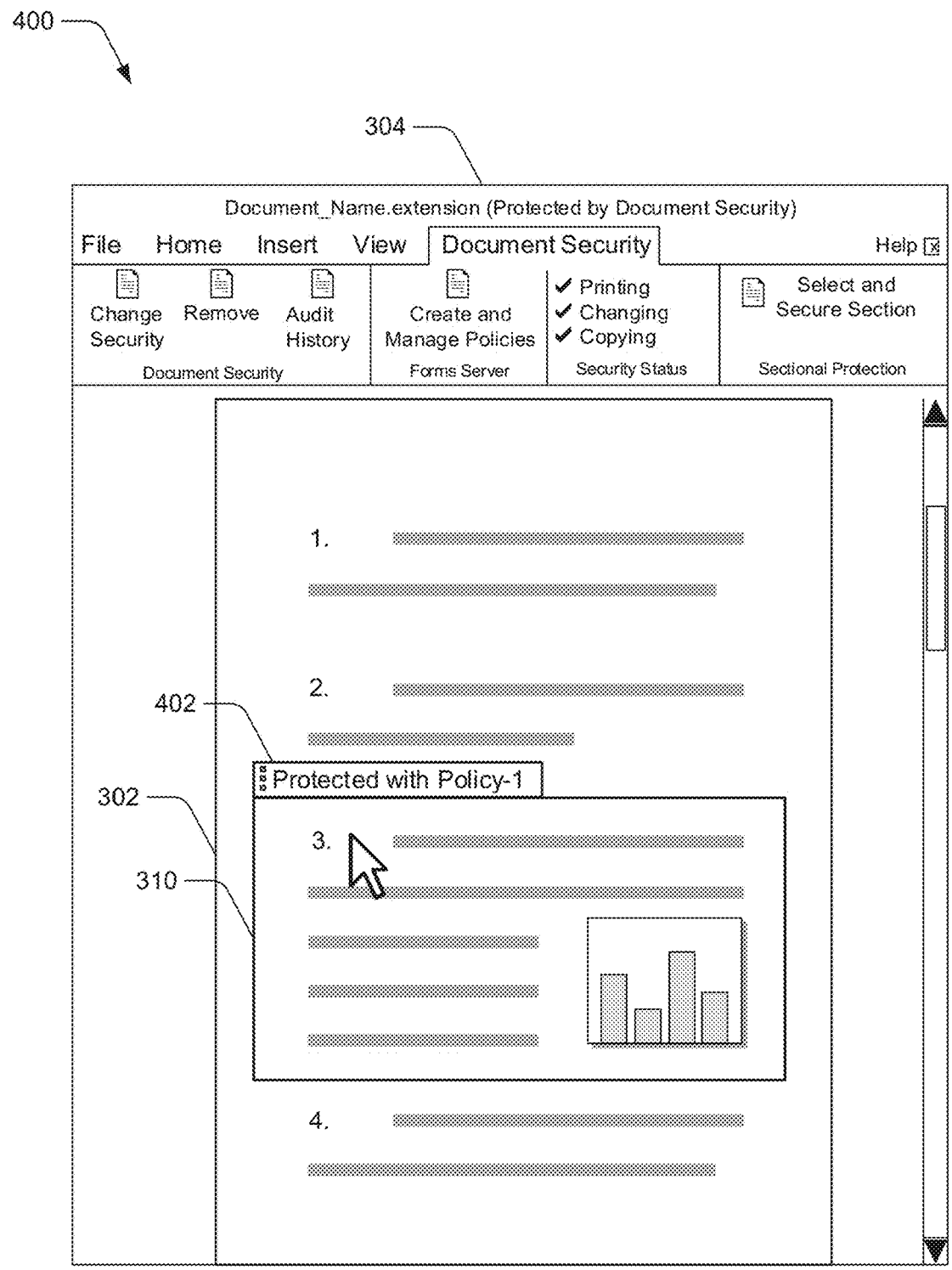
FIG. 4 depicts an example user interface in accordance with one embodiment that is operable to utilize techniques and systems for portion-level DRM in digital content in accordance with one or more embodiments.

Once the policy is applied to the selected portion 310, the document 302 can be displayed with visual indications of protected sections. For example, consider FIG. 4, which depicts an example embodiment 400 that illustrates portion-level DRM in digital content in accordance with one or more embodiments. When a user hovers the cursor over a protected section, or otherwise selects the protected section, such as portion 310, a visual indication can be displayed to notify the user that the selected section is protected by a policy. Any of a variety of visual indications can be utilized to notify the user. Some examples include highlighting the content within the protected section, displaying a shape or border around the protected section, displaying a popup, banner, or any other notification, and so on. In the illustrated example, the protected section is surrounded by a box with label 402 indicating that the section is protected with a policy named Policy-1. In this way, the user that has at least view permission for the protected section can immediately be informed of which policy is assigned to the protected section, which can further indicate which group of users have access rights to that section of the content. Alternatively, this visual indication may only be visible to authorized users, such as the author of the document 302, to further improve document security.

In embodiments, the protections can be enforced in response to opening the document 302. For example, a call to open the document 302 can be intercepted by the DRM module 112, which can implement patched functions (e.g., CreateFile). The patched function can parse an XML file associated with the document 302, such as an Office Open XML (OOXML) file, and then identify any protected XML structures. The user can be authenticated, such as by receiving the user's credentials. Based on the user's access rights, the DRM module 112 decrypts the protected portions of the document for which the user has permission to access. If there are portions that the user does not have authorization to access, then those portions can be replaced in memory by a placeholder text, or removed from the display of the document so the user is not aware of any missing portions of content. Alternatively, the protected portion can be replaced by a blackout area, a blank area, an image, an object, and so on. Also, anchors can be placed with relevant IDs to ensure that when the document is saved after modification, no data is lost.

If the document 302 is opened by a computing device that lacks a plugin required to enforce the DRM of the document 302, then a default predefined page (e.g., browser) can be opened and directed to a source from which the plugin can be downloaded. In embodiments, a notification can be displayed indicating that in order to view the document, a plugin is required to be installed, and the plugin can be acquired from a source, such as www.Adobe.com. Once the plugin is installed, the plugin can be activated to perform system level hooks associated with the document 302 by intercepting file system APIs, requesting user authentication, determining the user's permissions, and imposing DRM on the different portions of the document 302.

Example Procedures

The following discussion describes embodiments that may be implemented utilizing the previously described systems and devices to implement portion-level DRM in digital content. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 5:
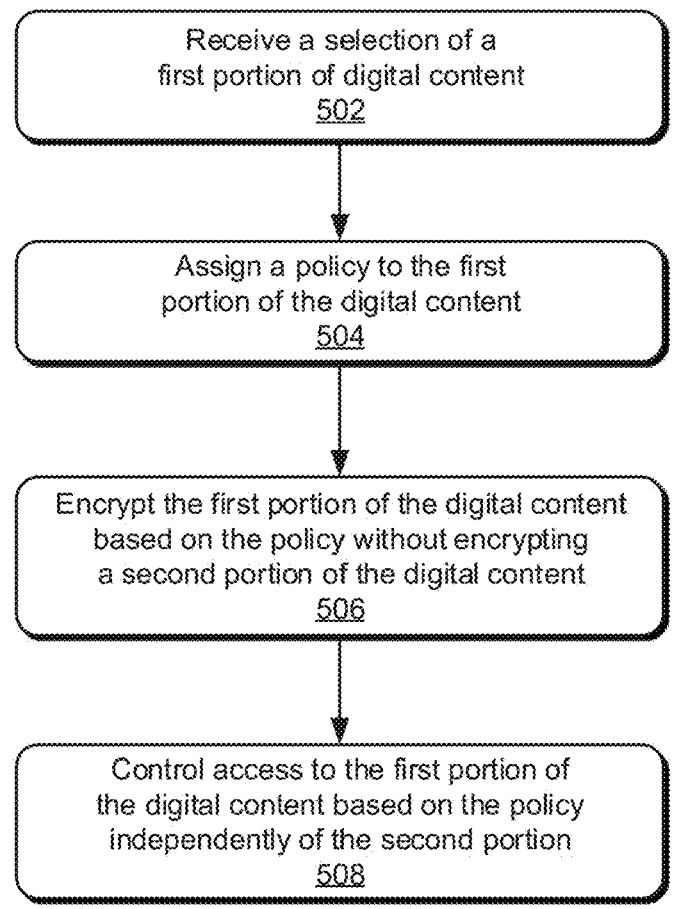
FIG. 5 is a flow diagram depicting an example procedure in accordance with one or more embodiments in which techniques for portion-level DRM in digital content are employed.

FIG. 5 is a flow diagram depicting a procedure 500 in accordance with one embodiment in which techniques for portion-level DRM in digital content are employed in accordance with one or more embodiments. A selection of a first portion of the digital content is received (block 502). For example, the first portion can be selected by highlighting the first portion with a cursor (e.g., highlighting text), clicking on the first portion (e.g., selecting an object or image), or any other suitable way of selecting a portion of the digital content. While the first portion is selected, the digital content can include other portions that remain unselected.

A policy is assigned to the first portion of the digital content (block 504). For example, a policy can be selected from a list of pre-defined policies and assigned to, or associated with, the selected portion of the digital content. In embodiments, the portion of content can have associated XML structures that are tagged with the policy to enable portion-level encryption of the XML structures. For example, a markup element with an identifier can be added to the XML structure of the first portion, where the identifier is associated with the policy.

The first portion of the digital content is encrypted based on the policy without encrypting other portions of the digital content (block 506). For example, a call to save the digital content can be intercepted and the markup element identified for the selected section of the digital content. Then, the associated XML structures of the selected portion can be encrypted based on the assigned policy, while the other portions of the digital content (e.g., portions not tagged with the policy) are not encrypted based on the same policy. However, another portion can be tagged with a different policy, and that other portion can be encrypted based on that different policy.

Access to the first portion of the digital content is controlled based on the policy independently of the second portion (block 508). Because the first portion is encrypted using the selected policy, only users having an authorized user ID (e.g., a user ID associated with the policy) can access the first portion. Other users who do not have the proper user ID are prevented from accessing that encrypted portion.

Instead, those other users may be limited to accessing portions of the digital content that are not encrypted.

For example, a call to open the digital content can be intercepted, and the digital content parsed to identify any protected XML structures that are encrypted with a policy. Once the user who initiated the call is authenticated based on a user ID, that user ID is used to determine which of those XLM structures to decrypt and open based on the policies used to encrypt those XML structures. In this way different renditions of the digital content can be provided to different users based on access rights of each of the different users. Each user can access only those portions of the digital content for which he or she has permission to access.

Figure 6:
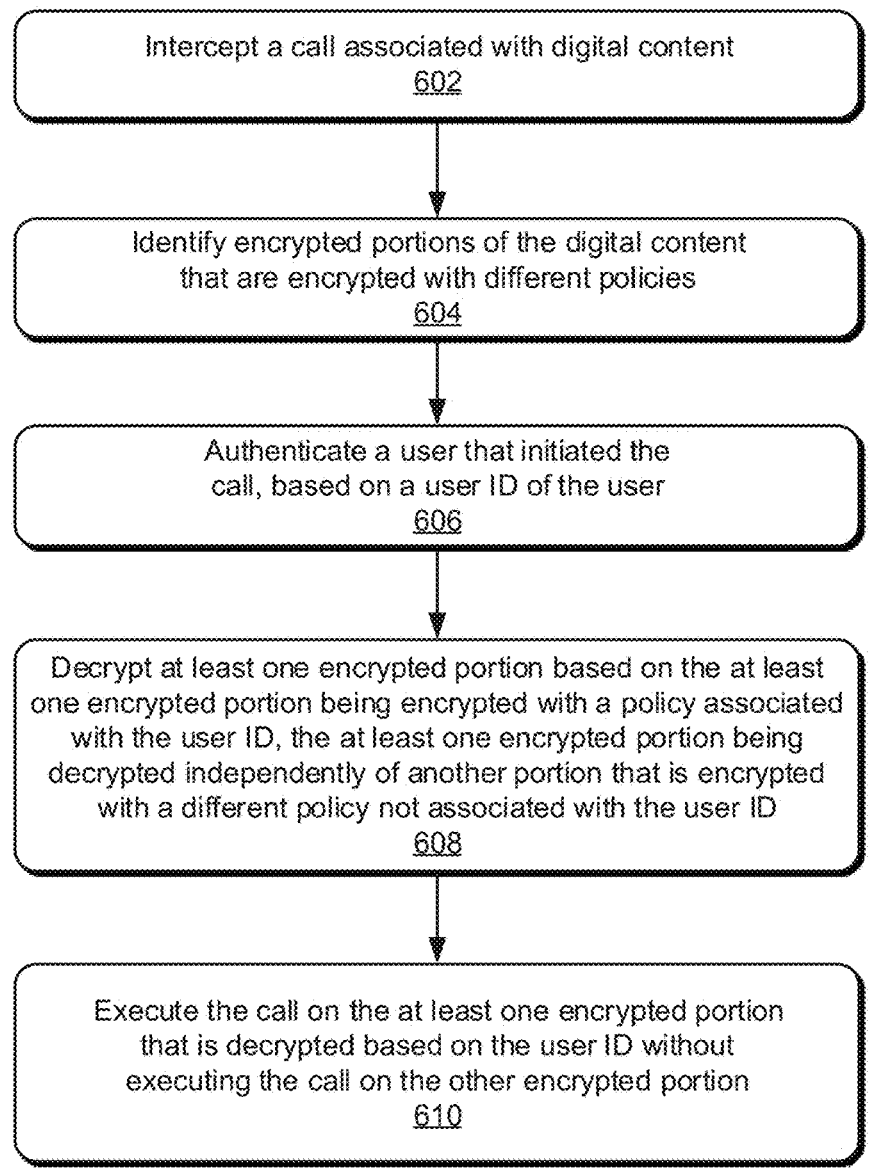
FIG. 6 is a flow diagram depicting an example procedure in accordance with one or more embodiments in which techniques for portion-level DRM in digital content are employed.

FIG. 6 is a flow diagram depicting a procedure 600 in accordance with one embodiment in which techniques for portion-level DRM in digital content are employed in accordance with one or more embodiments. A call associated with digital content is intercepted (block 602). This step can be performed in any suitable way, such as via a plugin or other suitable mechanism. In embodiments, the call can be to a file system or an application layer. Then, encrypted portions of the digital content that are encrypted with different policies are identified (block 604). In addition, a user that initiated the call is authenticated based on a user ID (block 606).

Subsequently, particular encrypted portions that were encrypted with a policy associated with the user ID are decrypted (block 608). For example, the particular encrypted portions can be decrypted based on the user ID independently of another encrypted portion that was encrypted with a different policy not associated with the user ID. Then, the call is executed on the particular portions that are decrypted based on the user ID without executing the call on the other encrypted portion (block 610). In this way, the call is prevented from executing on this other portion that was encrypted with the different policy not associated with the user ID. However, the call can still be executed on unprotected portions that are not encrypted based on any policy. In this way, the call can be executed on the unprotected portion regardless of authentication of the user.

Example System and Device

Figure 7:
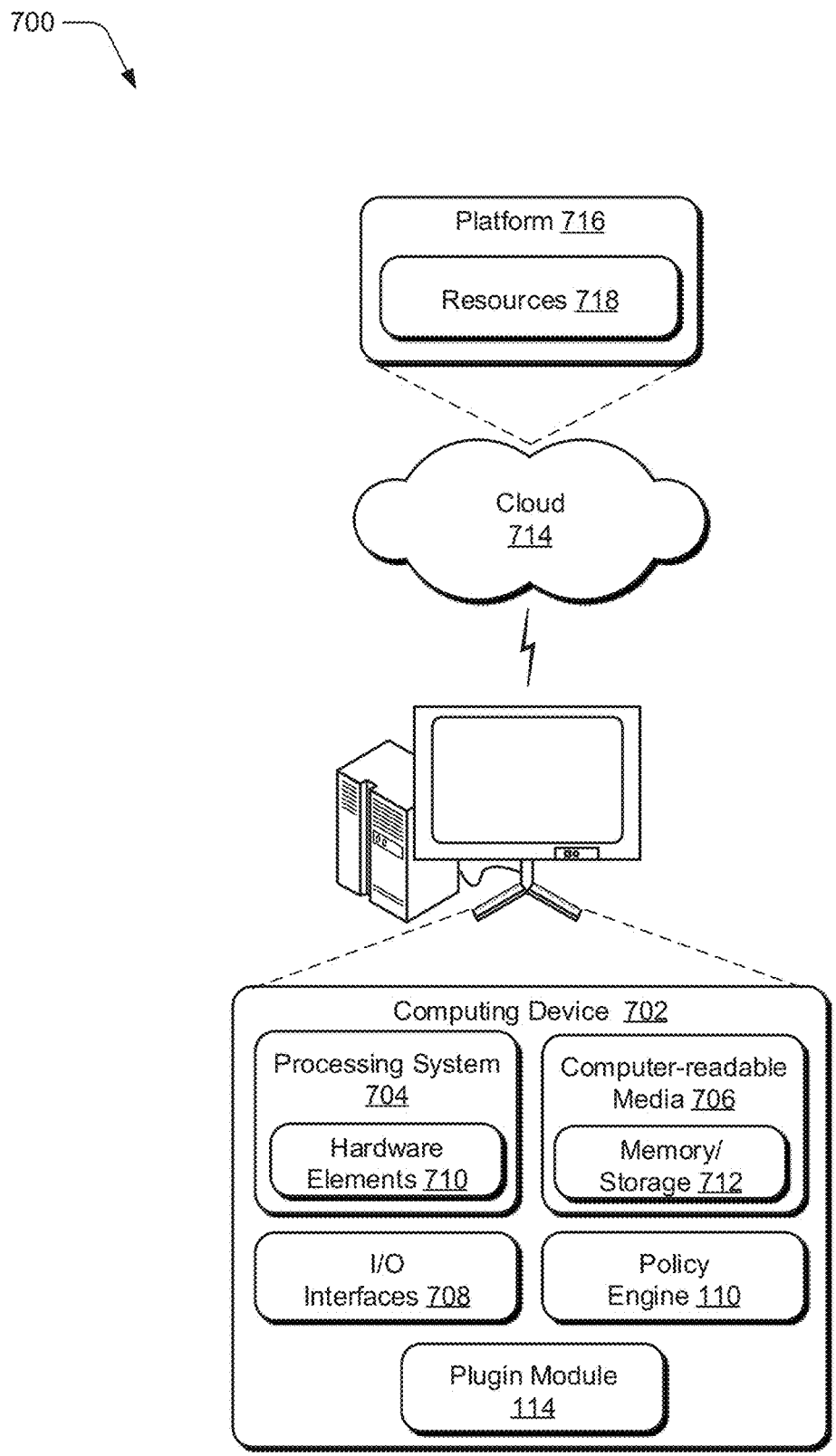
FIG. 7 illustrates various components of an example device that can be implemented as any type of computing device as described herein to implement the techniques and systems described herein.

FIG. 7 illustrates an example system generally at 700 that includes an example computing device 702 that is representative of one or more computing systems and/or devices that may implement the various techniques and systems described herein. This is illustrated through inclusion of the policy engine 110 and the DRM module 112. The policy engine 110 may be configured to create and manage policies that define permissions, such as access rights, to various users. The DRM module 112 is configured to enforce policies assigned to portions of digital content. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include embodiments in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, embodiments of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques and systems described herein may be supported by various configurations of the computing device 702 and are not limited to the specific examples of the techniques and systems described herein. This functionality may also be implemented all or in part through use of a distributed system, such as over a "cloud" 714 via a platform 716 as described below.

Cloud 714 includes and/or is representative of a platform 716 for resources 718. Platform 716 abstracts underlying functionality of hardware (e.g., servers) and software resources of the cloud 714. Resources 718 may include applications and/or data that can be utilized while computer processing is executed on servers that are remote from the computing device 702, including enterprise servers. Resources 718 can also include services 720 provided over the Internet and/or through a subscriber network, such as a cellular or Wi-Fi network.

Platform 716 may abstract resources and functions to connect computing device 702 with other computing devices. Platform 716 may also serve to abstract scaling of resources to provide a corresponding level of scale to encountered demand for resources 718 that are implemented via platform 716. Accordingly, in an interconnected device embodiment, implementation of functionality described herein may be distributed throughout system 700. For example, the functionality may be implemented in part on computing device 702 as well as via platform 716 that abstracts the functionality of cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment, a method implemented by at least one computing device to implement portion-level digital rights management (DRM) to control access to portions of digital content, the method comprising:
   receiving, by the at least one computing device, a selection of a first portion of the digital content, the digital content including a second portion;
   assigning, by the at least one computing device, a policy to the first portion of the digital content by at least adding a markup element with an identifier to the first portion;
   encrypting, by the at least one computing device, the first portion based on the policy without encrypting the second portion;
   receiving, by the at least one computing device, a call to open the digital content from a user that does not have a user identity associated with the policy; and
   controlling, by the at least one computing device, access to the digital content, the controlling including configuring the digital content to,
   display the second portion,
   replace the first portion of the digital content with a visual indication that access is denied to the first portion,
   display in real time, upon a selection of the second portion, visual indications of one or more permissions specific to the second portion, and update, in real time, the visual indications of the one or more permissions specific to the second portion.

2. A method as described in claim 1, wherein the policy includes a mapping between permissions provided to at least one user and a user identity associated with the at least one user.

3. A method as described in claim 1, wherein access provided as part of opening the digital content includes one or more of viewing, copying, printing, or modifying the second portion.

4. A method as described in claim 1, wherein encrypting the first portion of the digital content includes encrypting, using the policy, at least one extensible markup language (XML) structure corresponding to the first portion of the digital content.

5. A method as described in claim 1, wherein the controlling further configures the digital content to perform operations comprising:
receiving, from another user, another call to open the digital content;
intercepting the another call to open the digital content;
parsing the digital content;
identifying at least one protected extensible markup language (XML) structure associated with the first portion of the digital content, wherein the at least one protected XML structure is encrypted with the policy;
authenticating the another user based on a user identity of the another user; and
decrypting the first portion of the digital content based on authentication of the another user.

6. A method as described in claim 1, wherein the controlling further configures the digital content to perform operations comprising:
intercepting a call to save the digital content from the user; and
encrypting the first portion of the digital content in response to the call.

7. A method as described in claim 1, further comprising providing different renditions of the digital content to different users based on access rights of each of the different users.

8. A method as described in claim 7, wherein the access rights of the different users are controllable subsequent to distribution of the digital content to the different users.

9. In a digital medium environment, a method implemented by at least one computing device to implement portion-level digital rights management (DRM) to control access to portions of digital content, the method comprising:
receiving, by the at least one computing device, the digital content having a first portion encrypted based on a policy and a second portion that is not encrypted, the policy assigned to the first portion by adding a markup element with an identifier to the first portion;
receiving, by the at least one computing device, an open call initiated by a user to open the digital content;
determining, by the at least one computing device, that the user does not have a user identity associated with the policy; and
controlling access, by the at least one computing device, to the digital content, the controlling including:
displaying the second portion,
replacing the first portion of the digital content with a visual indication that access is denied to the first portion,
displaying in real time, upon a selection of the second portion, visual indications of one or more permissions specific to the second portion, and
updating, in real time, the visual indications of the one or more permissions specific to the second portion.

10. A method as described in claim 9, wherein the policy includes a mapping between permissions provided to at least one user and a user identity associated with the at least one user.

11. A method as described in claim 9, wherein access provided as part of opening the digital content includes one or more of viewing, copying, printing, or modifying the second portion.

12. A method as described in claim 9, wherein encrypting the first portion of the digital content includes encrypting, using the policy, at least one extensible markup language (XML) structure corresponding to the first portion of the digital content.

13. A method as described in claim 9, further comprising:
receiving, from another user, another call to open the digital content;
intercepting the another open call from the another user;
parsing the digital content;
identifying at least one protected extensible markup language (XML) structure associated with the first portion of the digital content, wherein the at least one protected XML structure is encrypted with the policy;
authenticating the another user based on a user identity of the another user; and
decrypting the first portion of the digital content based on authentication of the other user.

14. A method as described in claim 9, further comprising:
intercepting a call to save the digital content from the user; and
encrypting the first portion of the digital content in response to the call.

15. A method as described in claim 14, wherein the access rights of the different users are controllable subsequent to distribution of the digital content to the different users.

16. A method as described in claim 9, further comprising providing different renditions of the digital content to different users based on access rights of each of the different users.

17. In a digital medium environment, a system implemented to control portion-level digital rights management (DRM) in digital content, the system comprising:
a processor; and
non-transitory computer-readable storage media having thereon multiple instructions that, responsive to execution by the processor, cause the processor to perform operations including:
receiving the digital content having a first portion encrypted based on a policy and a second portion that is not encrypted, the policy assigned to the first portion of the digital content by adding a markup element with an identifier to the first portion of the digital content;
receiving an open call initiated by a user to open the digital content;
determining that the user does not have a user identity associated with the policy; and
controlling access to the digital content by:
displaying the second portion,
replacing the first portion of the digital content with a visual indication that access is denied to the first portion,
displaying in real time, upon a selection of the second portion, visual indications of one or more permissions specific to the second portion, and
updating, in real time, the visual indications of the one or more permissions specific to the second portion.

18. The system as described in claim 17, wherein the policy includes a mapping between permissions provided to at least one user and a user identity associated with the at least one user.

19. The system as described in claim 17, wherein access provided as part of opening the digital content includes one or more of viewing, copying, printing, or modifying the second portion.

20. The system as described in claim 17, wherein the operations further comprising:
   receiving, from another user, another call to open the digital content;
   intercepting the another open call from the another user;
   parsing the digital content;
   identifying at least one protected extensible markup language (XML) structure associated with the first portion of the digital content, wherein the at least one protected XML structure is encrypted with the policy;
   authenticating the another user based on a user identity of the another user; and
   decrypting the first portion of the digital content based on authentication of the another user.

\* \* \* \* \*